United States Patent
Wang et al.

(10) Patent No.: US 6,688,000 B2
(45) Date of Patent: Feb. 10, 2004

(54) JOINING OF TUBULAR PARTS IN A T-JOINT BY RIVETING/BRAZING

(75) Inventors: Pei-Chung Wang, Troy, MI (US); Peter C. Sun, Rochester Hills, MI (US); Chih-Chang Chen, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 32 days.

(21) Appl. No.: 10/010,369

(22) Filed: Nov. 13, 2001

(65) Prior Publication Data

US 2003/0088983 A1 May 15, 2003

(51) Int. Cl.[7] .................................................. B21D 53/88
(52) U.S. Cl. .................. 29/897.2; 29/897.3; 29/897.35; 29/421.1; 29/462; 29/466; 29/525.06; 29/525.14; 228/135; 228/165
(58) Field of Search ................................ 29/897, 897.2, 29/897.3, 897.33, 897.35, 421.1, 428, 458, 462, 464, 466, 525.02, 525.06, 525.13, 525.14, DIG. 4; 228/135, 165, 170, 173.1, 173.6, 174, 245, 246, 247, 248, 249, 250, 251, 252, 253, 254, 255, 256, 257, 258, 259, 260, 261, 262, 248.1, 248.5, 262.41, 262.42, 262.5, 262.51; 403/262, 230, 270, 271, 272; 296/193, 194, 195, 197, 203.01, 204, 203.02, 203.03, 203.04, 29, 121, 205

(56) References Cited

U.S. PATENT DOCUMENTS 3,688,550 A * 9/1972 Stanley ........................ 72/369
4,052,531 A * 10/1977 Steine et al. ................. 428/673
4,173,302 A * 11/1979 Schultze et al. ............. 228/219
4,330,077 A * 5/1982 Young ......................... 228/139
4,597,118 A * 7/1986 Mis ............................... 5/246
5,035,041 A * 7/1991 Matuschek .................... 29/509
5,071,174 A * 12/1991 Griffin et al. ........... 285/148.12
5,603,581 A * 2/1997 Fujita et al. ................. 403/272
5,665,187 A * 9/1997 Mackellar .................... 156/91
5,848,853 A * 12/1998 Clenet ......................... 403/272
6,015,182 A * 1/2000 Weissert et al.
6,123,378 A * 9/2000 Teply et al. ................... 296/29
6,378,349 B1 * 4/2002 Waldrop ....................... 72/326

* cited by examiner

Primary Examiner—Charles T. Jordan
Assistant Examiner—T. Nguyen
(74) Attorney, Agent, or Firm—Kathryn A. Marra

(57) ABSTRACT

In attempting to reduce deformity when joining vehicle frame components, a riveting/brazing process has been proposed. This process includes joining tubular members, such as hydroformed parts, by cutting at least one flange into one end of a first body member, shaped in conformance with the surface of a second body member. Location holes are formed into each flange as well as into the surface of the second member in suitable alignment with each other. A brazing filler material is fixed into a side of the flange, usually within a pocket, intending to lie on the surface of the second member when the two structures are attached. The flange(s) are initially attached to the surface of the second member by means of a rivet to formed an actual vehicle body assembly. Heat is then applied to the assembly to form a brazed T-joint.

19 Claims, 3 Drawing Sheets

JOINING OF TUBULAR PARTS IN A T-JOINT BY RIVETING/BRAZING

TECHNICAL FIELD

This invention relates generally to forming tubular or channel parts in a T-joint. More specifically, this invention relates to a method of joining said parts by a riveting and brazing method. The invention is useful in joining, e.g., hydroformed parts, in vehicle body or frame assembly.

BACKGROUND OF THE INVENTION

Automobiles, and other such motor vehicles, often include a frame and body assembly comprising several unique structures and/or shapes. In the past, vehicle body structures comprised panel and frame members, usually metallic such as steel. Steel has typically been used because of its relatively high strength, low cost and the ease by which it can be shaped into frame members or body panels. Recent studies have developed vehicular body structures that include relatively lighter materials, such as aluminum or magnesium, and/or irregularly shaped, thin-walled hydroformed structures that are designed to reduce the number of parts and the overall weight of the automobile.

The driving force for the introduction of hydroformed parts into the automotive industry is the desire to reduce the manufacturing cost and weight by consolidating parts. However, the application of tubular hydroformed parts for vehicle structures creates problems in vehicle fabrication and assembly. The joining of two hydroformed parts in a T-like joint has proven difficult. Attaching two tubular parts, or a channel-shaped part and a tubular part, at a right or an acute angle can be done by conventional welding techniques, such as spot welding or other fusion welding. However, it is sometimes difficult to fit the parts together. Moreover, the application of welding heat to relatively small areas of the thin-walled bulky structures often produces distortion of the parts at the weld region. This distortion can occur in the joining of steel parts but is particularly problematic in the joining of lower melting, lighter weight parts, such as those of aluminum or magnesium alloys.

Thus, it is an object of the present invention to provide a new method for joining tubular or tubular and channel-shaped components in a T-shaped joint. It is a further object to employ such a method that utilizes lower temperatures and less heat so as to minimize distortion of metal in the region of the T-joint. Such a method would have particular utility in joining thin-walled hydroformed parts or the like.

SUMMARY OF THE INVENTION

This invention provides a riveting/brazing process, which results in less heat distortion than is usually encountered in welding thin-walled tubular and/or channel parts in a T-joint. In making such a joint, the end of a first tubular or channel member must be attached at an acute or right angle to the side surface of a second tubular or channel member.

In accordance with the invention, one or more flanges are cut into one end of the first member. The purpose of the flange is to provide integral material of the first member to be attached to the surface of the second member. The flange is cut so that it can be shaped in conformance with the surface of the second member. Corresponding location holes are formed both in the flange(s) as well as in the intended joint surface of the second member. These location holes are made to achieve suitable alignment of the end of the first member with the joint surface of the second member. A brazing alloy is fixed to a side of the flange, or forming the flange to the surface of the second member. The flange(s) are attached to the surface of the second member by means of a rivet to form an assembly. Once completed, heat is applied to the assembly to form a brazed joint.

The flanges are formed on one end of the first member by cutting them into shapes that will allow good contact with the surface of the second member. For more complex structures, such as cylindrical tubes, several flanges may be necessary to accomplish a secure fit among the parts. Accordingly, a flange is to be cut and shaped so that it can be pressed into suitable conformance with the shape of the second member.

In a preferred embodiment of the invention, a pocket is formed in the surface of the flange(s) to receive a body of braze alloy filler material. The pocket can be shaped to accommodate the brazing alloy, which is suitably in the form of a rod, a ring, or a flat sheet. In a particularly preferred embodiment, the pocket is formed in the surface of the flange(s) so that the body of braze material protrudes about 0.01 to 0.5 millimeter. When the flange and protruding braze alloy is placed into contact with the forming surface, a space is provided for flow of molten braze alloy to bond the assembled flange and the surface of the second member.

In another preferred embodiment of the invention, each flange is attached to the surface of the second member, prior to brazing, by placing a rivet through their corresponding location holes. The rivet is sized to allow a suitable connection between the flange and the second member to accommodate the above-described brazing gap between the parts. Thus, the brazing alloy can better flow, from the pocket into the brazing gap, upon application of heat.

Other objects and advantages of this invention will become apparent from a detailed description of specific embodiments that follow.

DESCRIPTION OF THE PREFERRED EMBODIMENT

This invention provides a new method of forming a joint between tubular or channel shaped members. Such members are often used in the manufacture of a vehicle body frame. Often vehicle frame members are preformed into complex shape to accommodate the design shape of the vehicle and the attachment of body panels and other vehicle components, such as door hinges, latches and seat belt anchors. Obviously, the joint must provide suitable strength. The joint between the central pillar and the rocker frame member of a vehicle is illustrative of a typical T-type joint in vehicle manufacture.

Figure 1:
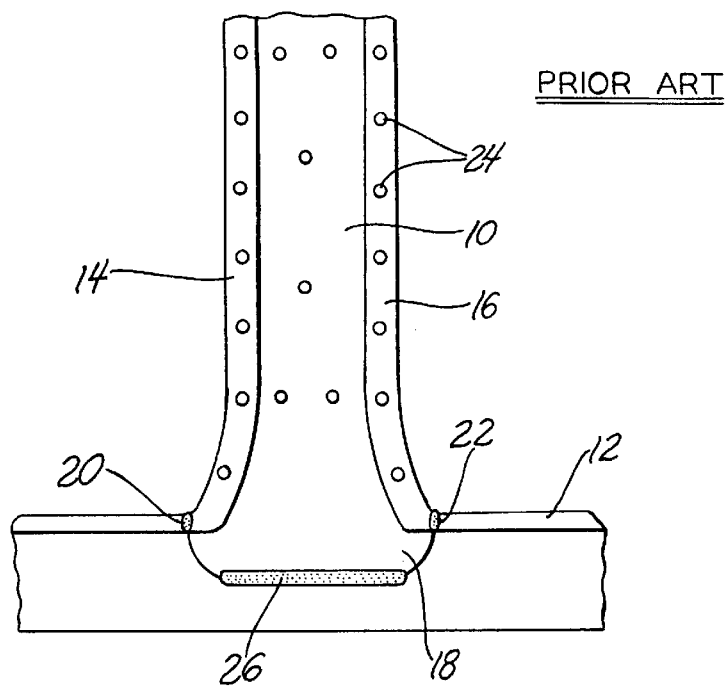
FIG. 1 is a generic T-joint representative of welded pillar-to-rocker connection used in a vehicular body assembly.

FIG. 1 illustrates a welded T connection between a channel-shaped pillar member 10 and a tubular rocker member 12. Pillar channel 10 has been formed with side flanges 14, 16 and an end flange 18. A portion of flanges 14, 16 and end flange 18 are used in welding an end of pillar 10 to sides of rocker 12. The respective weld beads are shown at 20, 22 and 26. Also shown in FIG. 1 are a series of spot welds 24 by which channel member 10 is attached to a separately formed inner pillar member (not shown).

The pillar 10 in FIG. 1 requires two members, which must be welded together in a separate operation. Moreover, the application of welding heat to small regions of a complex assembly often leads to distortion of the assembly. This invention provides a way of utilizing tubular frame members in attaching the end of one tube to the body of a second tube without the use of welding heat that results in distortion of the assembly.

Figure 2:
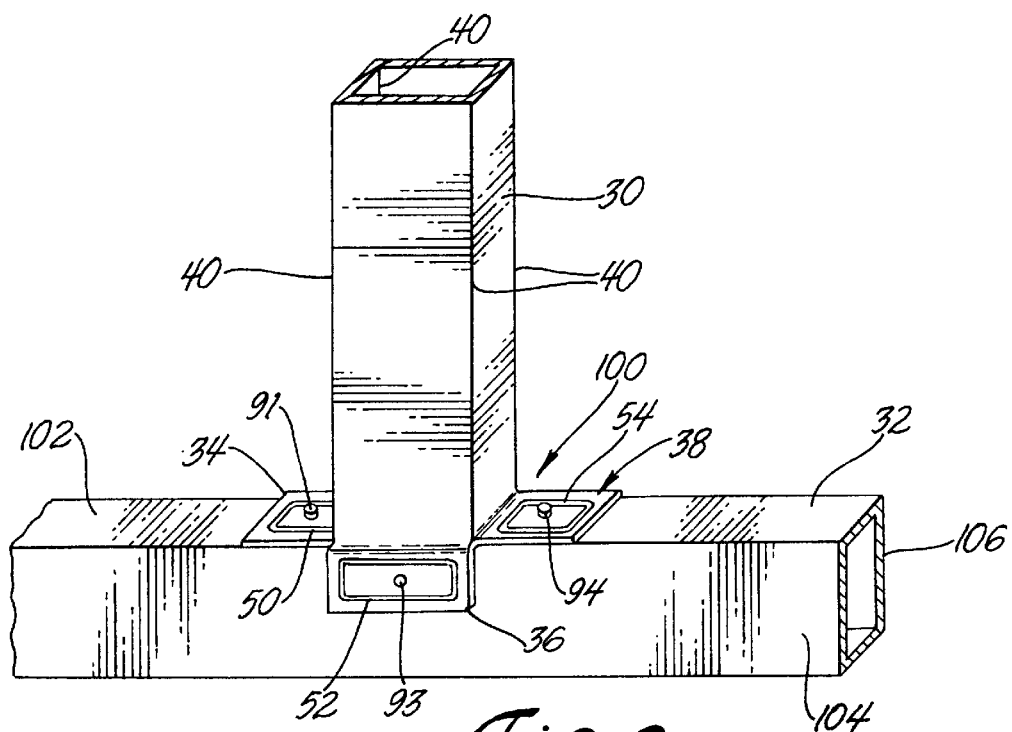
FIG. 2 shows a completed body assembly in accordance with the invention comprising a brazed T-joint using rectangular tubes.

FIG. 2 shows a frame assembly comprising a vertical pillar tube 30 and a horizontal rocker tube 32. The joint 100 that is formed is generally referred to as a T-joint and is made to join body members at angles of 90° or less. The frame members shown in FIG. 2 can include a variety of irregular shapes and conformations.

As seen in FIG. 2, pillar, or first member, 30 is attached to rocker, or second member, 32 utilizing four flanges (three shown 34, 36 and 38). These flanges were formed by cutting along the corners 40 from the end of the pillar tube 30 to be attached to the side of rocker 32. The cuts allow the separation of discrete, generally rectangular, flanges 34, 36, and 38. In forming the flanges on the pillar member 30, flanges 34 and 38 are bent 90° away from the vertical direction of the pillar member 30. Flange 36 and the rear flange (not shown) are bent as necessary to fit over the top surface of 102 and around sides 104, 106 of rocker 32.

Still referring to FIG. 2, each flange 34, 36 and 38 comprises a rivet 91, 93 and 94, for temporarily securing the flange to an underlying surface 102, 104 or 106 as will be described below. Each flange 34, 36 and 38 also contains a pocket 50, 52 and 54 to contain a body of braze alloy. Thus, the T-joint 100 in FIG. 2 comprises brazed bonds between the several flanges and the underlying surfaces of the rectangular rocker tube 32. The method of forming T-joint 100 will be better understood by reference to FIGS. 3–5.

Figure 3:
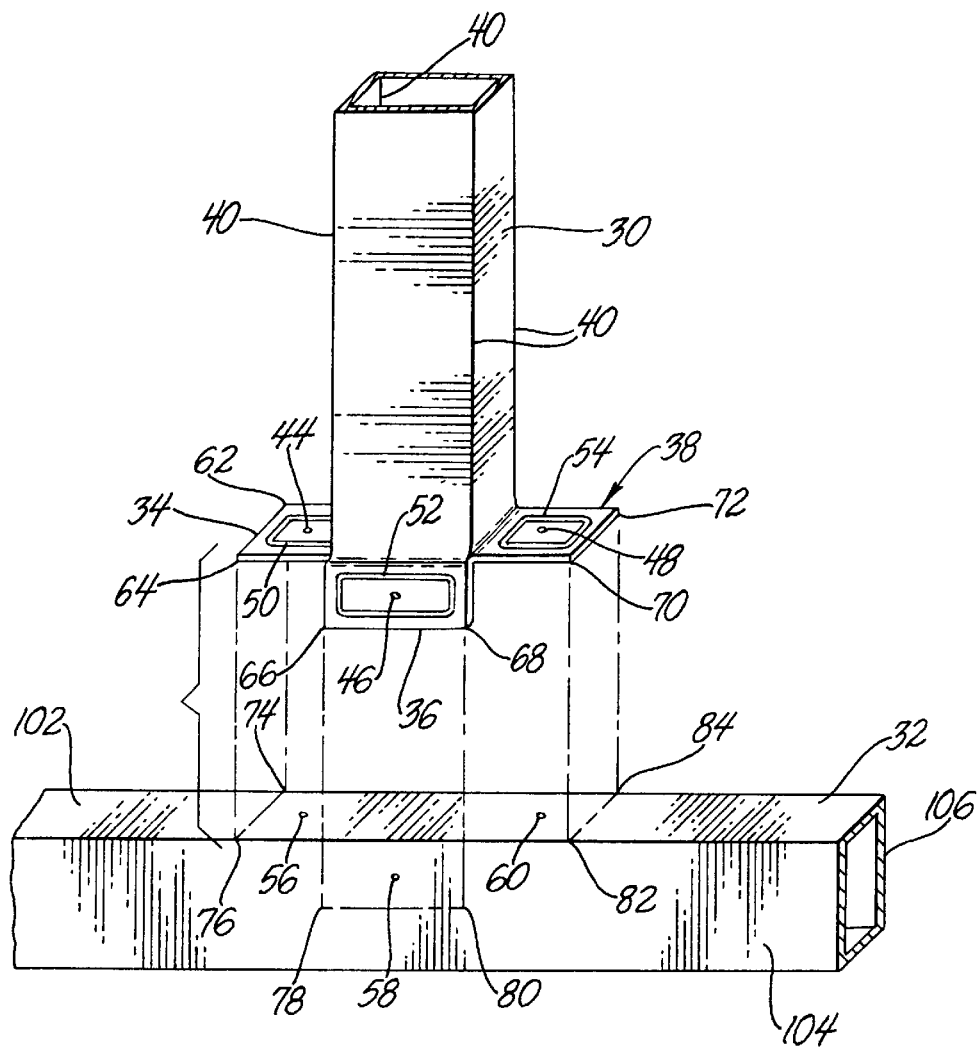
FIG. 3 is an exploded view prior to assembly and brazing for making the joint of FIG. 2.

Preparation of the individual body members is generally shown in an exploded view of the pillar-to-rocker assembly in FIG. 3. This view better shows pillar member 30 prior to it being riveted and brazed to rocker member 32. As seen in the exploded view, one end of pillar tube 30 has been cut back along each of its corners 40 to form four flanges of which three 34, 36, and 38 are seen in FIG. 3. The number of flanges needed will depend on the complexity of the rocker member's shape and conformation. Furthermore, additional cuts or shaping may be required in any given flange in order to bend it into conformation with the surface of the tube, or channel, member to which it is to be attached. In the relatively simple embodiment of attaching an end of a square tube to the side of another square tube, four square, or rectangular, flanges are suitable.

In the pre-assembled embodiment of FIG. 3, securing pillar member 30 to rocker member 32 in position is essential to obtain a perfected brazed joint. The preferred embodiment uses rivets that are placed through location holes 44, 46 and 48 that are formed in flanges 34, 36 and 38 and their corresponding location holes 56, 58 and 60 formed in rocker member 32. Depending upon the shape and conformation of the flange, positioning of the location holes on the flange surface can be tailored to obtain an optimum brazed joint among frame members. Once the optimum position of the location hole formed in a flange is determined, a respective location hole can be formed on rocker member 32. Location holes that are formed into the second member can be completed during hydroforming operation.

According to FIG. 3, when lining up the location holes from the pillar member 30 to the rocker member 32, corner 72 of flange 38 will end up at point 84 on the rocker member 32, while corner 70 of the flange will end up at point 82 of the rocker member 32. Accordingly, corners 62, 64 of flange 34 will end up at points 74, 76, respectively, and corners 66, 68 of flange 36 will end up at points 78, 80, respectively. Once attached, flanges 34, 36 and 38 will lie on surfaces 102, 104 and 106 of rocker member 32.

Figure 4:
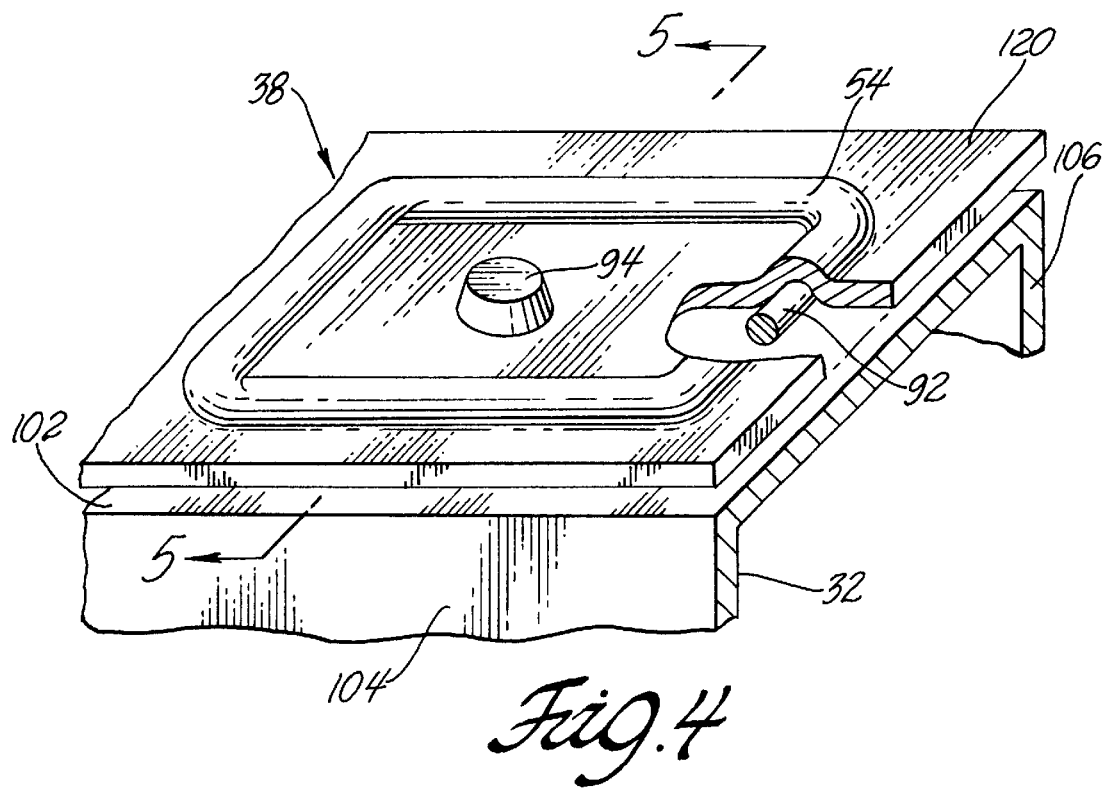
FIG. 4 is a view of a flange isolated from the FIG. 3 view, partially broken away and in section showing a location hole and the placement of a rod of braze alloy.

An isolated view of flange 38 and the underlying surface of rocker 32 is depicted in FIG. 4. Flanges 34, 36 and 38 includes pocket 50, 52 and 54 that have been formed under the surface of the flanges. A pocket is a continuous recess that can be made by hydroforming or alternative methods, such as stamping. The shape of the pocket should conform to the shape of braze material 92 that will soon be placed inside it. The suggested braze alloy 92 for this embodiment is either a silver-copper-zinc base alloy for brazing steel or an aluminum-silicon alloy for brazing aluminum. In the process of brazing steel with a silver-copper-zinc alloy, a white flux is generally used. Since capillary attraction between the steel and the filler material is much higher than that between the steel and the flux, the flux is displaced by filler material. Braze alloy 92 is shown as a rod bent to the shape of pocket 54 and press fit into it. Obviously, braze alloys could take other shapes as well. Typically, the braze alloy 92 has a thickness in the range of 0.1 to 3 millimeters.

Figure 5:
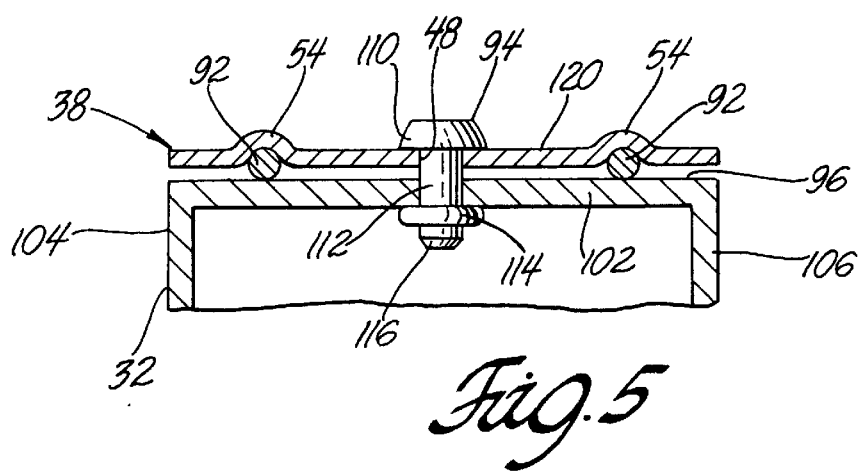
FIG. 5 is a cross sectional view of the pillar flange and underlying rocker side as shown in FIG. 4 in the direction of arrows 5—5 of that figure.

Referring to FIGS. 4 and 5, flange 38 is initially attached to rocker 32 with a rivet 94 placed inside of location hole 48 centered on the a flange surface 120. The rivet is placed through location hole 48's respective location hole 60 that is formed on the surface 102 of rocker member 32. Though a selection of rivets can be used in this process, the rivet used in this embodiment is a blind rivet that includes a head 114, a hollow body 112, a mandrel 116, and a collapsible blind end 110. Using a suitable rivet gun, the hollow body 112 of rivet 94 is inserted through overlying location holes 44, 60 until rivet head 110 engages flange surface 120. The gun then upsets hollow body 112 to form rivet head 114 against rocker 32. As seen in FIG. 5, rivet 94 snugly attaches flange 38 to rocker member 32 where then conforming surfaces can be brazed. A portion of braze rod 92 protrudes from flange pocket 54 defining a gap 96 for flow of molten braze material. The optimum brazing gap 96 is generally in the range of 0.1 to 1 millimeters. In general, the rivet is used as a "net" locator to fix pillar member 30 and rocker member 32 in proper position before commencing the brazing process.

In general, the method of brazing comprises the application of heat to join two structures. The brazing technique is analogous to that of welding but is performed at temperatures that will mitigate deformity of the vehicle body part. Brazing joins materials by heating them in the presence of a braze alloy while having a liquidus temperature above 450° C. but below the solidus temperature of the base material(s) used. Since melting of the base material is not involved and the peak temperature is controllable, the brazing process reduces the residual stress and distortion of the components.

Once pillar member 30 and rocker member 32 have been joined using rivets, heat is then applied to the frame assembly by application of a heat source, such as a torch, laser, or induction heating. When the brazing temperature is reached, the braze alloy is melted between the surfaces of the joint area, also known as the brazing gap 96. As a result of capillary attraction, the molten filler material flows into gap 96 between flanges 34, 36 and 38 and the fourth flange (not shown) and the second member 32, and is consequently distributed between the closely fitted-surfaces of the joint 100. To achieve mechanically sound joints, various process variables (e.g., brazing temperature, time, thickness of the filler material, and spacing between the parts) for each application need to be tested and tried.

The method and procedure described above may be used for attaching various automotive components that have sheet metal or tubular flange portions. Examples include sheet-to-extrusions, sheet-to-cast parts and tube-to-tube parts, various vehicle components such as roof rail-to-cast node applications and roof rail to pillar application and the like.

While the invention has been described in the context of the preferred embodiments, it is not intended to be limited to the above description, but rather only to the extent set forth in the following claims.

What is claimed is:

1. A method of joining an end of a first sheet metal tubular or channel shaped member to the side of a second sheet metal tubular or channel shaped member, said method comprising:

forming at least one flange strip at said end of said first member from the first member, said flange strip being adapted for shaping into conformance with the surface of the side of said second member at which the joint is to be formed;

forming corresponding location holes in said flange strip and in the surface of said second member for locating said flange strip;

fixing a brazing filler material to a side of said flange strip intended to lie against the surface of said second member;

shaping said flange strip against said side of said second member with said location holes aligned;

mechanically attaching said flange strip to said second member with rivets; and brazing said flange strip to said second member.

2. A method as recited in claim 1, wherein said second member is hydroformed.

3. A method as recited in claim 1, wherein said first member is hydroformed.

4. A method as recited in claim 1, comprising forming a pocket in said flange strip for receiving a body of brazing filler material and placing said body into said pocket prior to said brazing step.

5. A method as recited in claim 3, wherein said brazing filler material is in the form of a ring, sheet, or rod, and having a thickness of approximately 0.1 to 3 millimeters.

6. A method as recited in claim 1, wherein said rivet is a blind rivet that is inserted through said location hole in said flange strip into said second member.

7. A method as recited in claim 1 or 5, wherein said brazing filler material comprises a silver-copper-zinc base alloy if said second member and/or said first member comprise steel.

8. A method as recited in claim 1 or 5, wherein said brazing filler material comprises an aluminum-silicon base alloy if said second member and/or said first member comprise aluminum.

9. A method as recited in claim 1, wherein said first member is a channel shaped pillar member and said second member is a tubular rocker member.

10. A method as recited in any of claims 1–9, in which a plurality of flange strips are formed at the end of said first member and each flange strip is subjected to the following process steps of claim 1.

11. A method of joining an end of a first sheet metal tubular or channel shaped member to a second sheet metal tubular or channel shaped member in a T-shaped joint where said first member is to be the vertical portion of the T and the second member is the crossing portion of the T, said method comprising:

cutting from said end of said first member to form a plurality of flanges for shaping into conformance with the surface of said second member at which the joint is to be formed, and with respect to each said flange;

forming corresponding location holes in each of said flange and in the surface of said horizontal body member for locating said flange;

forming a pocket into said flange to receive a body of brazing filler material;

fixing said body of brazing material in said flange such that said body protrudes from said pocket;

shaping said flange against said second member with said location holes in alignment such that said protruding body defines a gap between said flange and the underlying surface for the flow of braze alloy;

mechanically attaching said flange to said second member with rivets; and brazing said flange to said second member.

12. A method as recited in claim 11, wherein said second member is hydroformed.

13. A method as recited in claim 11, wherein said first member is hydroformed.

14. A method as recited in claim 11, wherein said body of brazing filler material is in the form of a ring, sheet, or rod, and having a thickness of approximately 0.1 to 3 millimeters.

15. A method as recited in claim 11, wherein said rivet is a blind rivet that is inserted through said location hole in said flange strip into said second member.

16. A method as recited in claim 11 or 14, wherein said brazing material comprises a silver-copper-zinc base alloy if said second member and/or said first member comprises steel.

17. A method as recited in claim 11 or 14, wherein said brazing material comprises an aluminum-silicon base alloy if said second member and/or said first member comprise aluminum.

18. A method as recited in claim 11, wherein said first member is a channel shaped pillar member and said second member is a tubular rocker member.

19. A method of joining an end of a first hydroformed member to a second hydroformed member, comprising steel or aluminum, in a T-shaped joint where said first member is to be the vertical portion of the T and the second member is the crossing portion of the T, said method comprising:

cutting from said end of said first member to form at least one flange strip for shaping into conformance with the surface of said second member at which the joint is to be formed;

forming corresponding location holes in each of said flange strip(s) and in the surface of said horizontal body member for locating said flange strip(s);

forming a pocket into said flange strip(s) to receive a body of brazing filler material, such that said body protrudes from said pocket to define a brazing gap;

fixing said brazing filler body in said pocket of said flange strip(s), where said brazing filler material comprises a silver-copper-zinc alloy in application to steel body members or an aluminum-silicon alloy in application to aluminum body members;

shaping said flange strip(s) against said side of said second member with said location holes in alignment of the two so that the protruding brazing body causes a brazing fillet gap between said flange strip(s) and said second member;

mechanically attaching said flange strip(s) to said second member with rivets, where said rivets are inserted through said location holes to which said flange strips (s) and said second member to preserve said brazing gap among said flange strip(s) and said second member; and brazing said flange strip(s) to said second member.

* * * * *